UNITED STATES PATENT OFFICE.

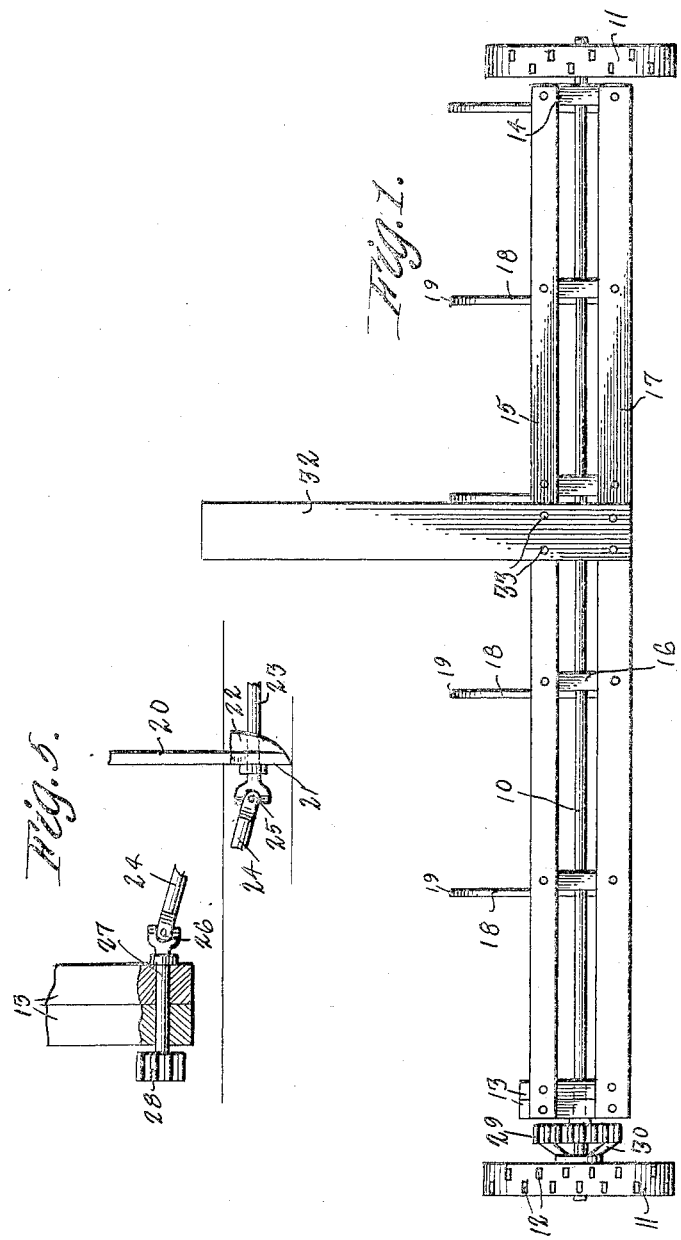

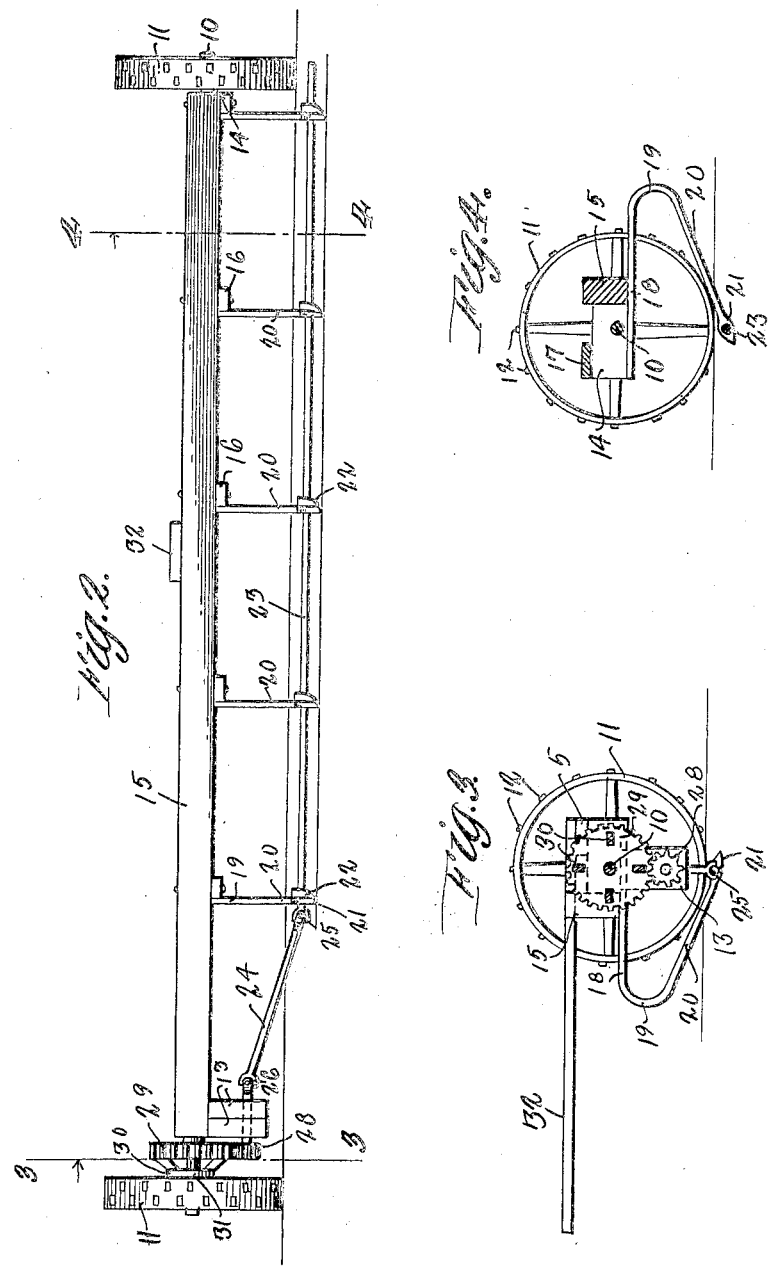

NATHANIEL GERALD ISAAK AND GOTTHILF ISAAK, OF AMERICAN FALLS, IDAHO.

ROTARY-ROD WEEDER.

1,329,839.   Specification of Letters Patent.   Patented Feb. 3, 1920.

Application filed April 16, 1919. Serial No. 290,482.

*To all whom it may concern:*

Be it known that we, NATHANIEL G. ISAAK and GOTTHILF ISAAK, citizens of the United States, residing at American Falls, in the county of Power and State of Idaho, have invented certain new and useful Improvements in Rotary-Rod Weeders, of which the following is a specification.

This invention relates in general to weeding devices and has for its principal object the production of an apparatus which may be propelled to weed a maximum area of ground in a single operation.

A further object of this invention is the production of a weeder wherein the frame is constructed to present little resistance in places where tall weeds become entangled.

Another object of this invention is the production of a weeder wherein a rotary rod is provided and is to pass under the surface of the ground to uproot the weeds where the weeds will be exposed to the sun and thus prevent the same from again springing up as is the case where they are just cut down.

A still further object of this invention is the production of a rotary rod weeder wherein efficient means is provided for supporting the rod and directing the same under the surface of the ground, although means is also employed for easily tilting the frame to adjust the depth to which the rod digs and passes.

One practical form of construction and assembly of the present invention will be hereinafter described and is illustrated in the drawings, in which:—

Figure 1 is a top plan view of the rotary rod weeder.
Fig. 2 is a front elevation of the device.
Fig. 3 is a vertical section taken on the line 3—3 of Fig. 2.
Fig. 4 is a vertical section taken on the line 4—4 of Fig. 2.
Fig. 5 is a fragmentary detail view of a portion of the device illustrating the connection between the pinion and the rotary rod.

In the preferred embodiment of the present invention about to be described, it will be seen that the main axle 10 has ground wheels 11 at its ends, these wheels being provided with the usual cleats 12 upon the peripheries thereof to hold the same from slipping or skidding.

The main frame of the device consists of end blocks 13 and 14 through which the axle 10 extends. The rear supporting beam 15 is secured in any desired manner upon the blocks 13 and 14 and also has intermediate blocks 16 connected thereto, through which the axle 10 extends as shown in Fig. 4. A supporting board 17 may be also fixed upon the blocks 13 and 14 and 16 although it is obvious that any other desired form of a supporting frame may be provided.

The hanger brackets for the rotary rod comprise horizontal bodies 18 having curved portions 19 from which extend the downwardly slanting fingers 20. Each finger 20 is provided with a head 21 upon its lower end having a pointed front end to direct the head below the surface of the ground. Hardwood bearings 22 are fixed upon the sides of the heads 21 and these bearings 22 have curved outer side surfaces slanting to give the bearings pointed front ends. The upper edges of the bearings slant downwardly and assist in directing the heads into the ground. The bodies 18 pass under the beam 15 and engage the side surfaces of the intermediate blocks 16 and also the blocks 14. These bodies may be secured in any desired manner and therefore it will be seen that the hanger brackets will be supported to extend below the main frame of the device. The rotary rod 23 is carried by the heads 21 of the hanger brackets and passes through the bearings 22 and it will be noted that the rod is cylindrical in cross section. A link 24 is connected to one end of the rotary rod 23 by a universal joint 25. The opposite end of the link 24 is connected by a second universal joint connection 26 to the shaft 27 carried by the lower end of the block 13, it being noted that these blocks depend downwardly for a considerable distance. A pinion 28 is keyed upon the opposite end of this shaft 27.

The main drive gear 29 is carried upon the axle 11 and is connected by the braces 30 to the hub 31 of one of the wheels 11 and as shown in Figs. 1 and 2. This gear 29 meshes with the pinion 28.

The board or platform 32 is fixed as indicated at 33 upon the beam 15 and board 17 of the main frame and extends for a considerable distance beyond the main frame as shown in Fig. 1. When the device is in operation it may be propelled in any desired manner. At this time the wheels 11 will be rotated and consequently the gear 29 will rotate to in turn drive the pinion 28. As the pinion rotates it will impart rotary motion to the shaft 27 and then the joint 26 will cause the link 24 to rotate and turn the joint 25. Thus rotary motion will be imparted to the rod 23, which because of its cylindrical construction will present only a minimum amount of resistance as the same passes below the surface of the ground.

Therefore it will be noted that as the rod moves below the surface of the ground and is rotated it will easily uproot the weeds and throw the same upon the surface of the ground where they will be exposed to the sun's rays and will wither and thus die and such action will prevent the rerooting of such weeds. The frame is composed of a minimum number of parts to reduce as much as possible the entanglement of tall weeds which may be engaged with the same.

The operator may stand upon the board 32 adjacent the frame and consequently the heads 21 and bearings 22 of the head 20 of the hanger brackets will direct the rod 23 below the surface of the ground. If, however, it is desired to have the rod nearer to the surface of the ground, the operator may walk toward the frame #15 on board #32 as there is not sufficient suction without the weight of the operator therefor it will allow the rod 23 to run above the ground then he will step on frame 15 which will take the entire weight of the operator of the board 32 and this action will allow the rod 23 to run above the ground.

It will therefore be seen that a rotary rod weeder has been provided, wherein the hanger brackets efficiently support the rod when the same rotates and they may also force the rod under the surface of the ground, due to the construction of the heads and the bearing blocks thereof. However, the board mounted upon the frame, permits the operator to walk therealong and thus swing the frame of the device upon the axle to adjust the depth to which the rod will pass or to lift the rod entirely from the ground when it is desired to move the rod over surfaces not to be disturbed.

The foregoing description and accompanying drawings have reference to what might be considered to be the approved or preferred form of our invention. We desire it to be understood that we may make such changes in construction, combinations and arrangement of parts, materials, dimensions, et cetera, as may prove expedient and fall within the scope of the appended claims.

Having thus fully described our invention what we claim as new and desire to secure by Letters Patent, is:—

1. In a device of the character described, the combination of an axle having supporting wheels, a supporting frame swingably mounted upon said axis, hanger brackets comprised of horizontal portions having downwardly turned ends terminating in downwardly slanting fingers, said fingers terminating in heads having pointed front ends, downwardly slanting bearing blocks fixed upon the sides of said heads, a rotatable rod of cylindrical construction carried by said heads and blocks, means for rotating said rod, whereby said heads and blocks will direct said rod under the surface of the ground, and a board fixed upon said frame, whereby as pressure is applied to the board the frame will be swung to regulate the vertical movement of the said rod.

2. In a device of the character described, the combination of an axle having supporting wheels, a supporting frame swingably mounted upon said axle, hanger brackets consisting of horizontal portions having downwardly turned ends terminating in downwardly slanting fingers, said fingers terminating in heads having pointed front ends, a rotatable rod of cylindrical construction carried by said heads, means for rotating said rod, whereby said heads will direct said rod under the surface of the ground, and a board fixed upon said frame, whereby as pressure is applied to the board the frame may be swung to regulate the vertical movement of said rod.

3. In a device of the character described, the combination of an axle having supporting wheels, a supporting frame swingably mounted upon said axle, hanger brackets consisting of horizontal portions having downwardly turned ends terminating in downwardly slanting fingers, said fingers terminating in heads, a rotatable rod carried by said heads, means for rotating said rod, and a board fixed upon said frame, whereby as pressure is applied to the board the frame will be swung to regulate the vertical movement of said rod.

In testimony whereof we affix our signatures in presence of a witness.

NATHANIEL GERALD ISAAK.
GOTTHILF ISAAK.

Witness:
CHAS. T. COTANT.